(12) United States Patent
Krishnamurthy

(10) Patent No.: US 9,370,783 B2
(45) Date of Patent: Jun. 21, 2016

(54) APPARATUSES AND METHODS FOR GAS-SOLID SEPARATIONS USING CYCLONES

(71) Applicant: UOP LLC, Des Plaines, IL (US)

(72) Inventor: Sujay R. Krishnamurthy, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 125 days.

(21) Appl. No.: 14/228,698

(22) Filed: Mar. 28, 2014

(65) Prior Publication Data

US 2015/0273483 A1    Oct. 1, 2015

(51) Int. Cl.
| | |
|---|---|
| *B01D 45/12* | (2006.01) |
| *B04C 3/06* | (2006.01) |
| *B04C 3/04* | (2006.01) |
| *B04C 3/00* | (2006.01) |

(52) U.S. Cl.
CPC . *B04C 3/06* (2013.01); *B01D 45/12* (2013.01); *B04C 3/04* (2013.01); *B04C 2003/006* (2013.01)

(58) Field of Classification Search
CPC ...... B01D 45/12; B01D 45/16; B01D 50/002; B01D 17/0217; B04C 3/04; B04C 3/06
USPC .............. 55/457, 394, 347, 337, 398; 95/269; 209/60, 710
See application file for complete search history.

(56) References Cited

U.S. PATENT DOCUMENTS

| | | | | |
|---|---|---|---|---|
| 3,611,679 A | * | 10/1971 | Pall | B01D 45/16 55/457 |
| 3,895,930 A | * | 7/1975 | Campolong | B01D 45/16 55/394 |
| 3,915,679 A | * | 10/1975 | Roach | B04C 3/06 55/347 |
| 4,176,083 A | * | 11/1979 | McGovern | B01J 8/0055 208/150 |
| 4,289,611 A | * | 9/1981 | Brockmann | B04C 3/04 209/710 |

(Continued)

FOREIGN PATENT DOCUMENTS

| | | |
|---|---|---|
| AU | 2009100485 | 7/2009 |
| EP | 298671 | 1/1989 |

(Continued)

OTHER PUBLICATIONS

Peng et al., "Experimental study of the vortex end in centrifugal separators . . . ," Chemical Engineering Science (2005), 60(24), 6919-6928.

(Continued)

*Primary Examiner* — Duane Smith
*Assistant Examiner* — Minh-Chau Pham
(74) *Attorney, Agent, or Firm* — James C. Paschall

(57) ABSTRACT

Cyclones for gas-solid separators are provided, which are especially applicable for use in a downflowing third stage separator (TSS) for the removal of dust particles, such as solid catalyst fines, from the flue gas streams exiting the catalyst regenerator in fluid catalytic cracking (FCC) processes. A cyclone has a barrel having an interior, and a central hub disposed within the interior of the barrel. A plurality of concentric annular sections are disposed radially between the barrel and the central hub. Swirl vanes extend radially into at least one of the annular sections to define a swirl chamber within said at least one of the plurality of annular sections. At least one solid particle outlet is disposed at a lower end of the barrel. A gas outlet is in fluid communication with the interior of the barrel.

20 Claims, 2 Drawing Sheets

(56) References Cited

U.S. PATENT DOCUMENTS

| | | | |
|---|---|---|---|
| 4,537,608 A * | 8/1985 | Koslow | B01D 50/002 55/337 |
| 4,702,846 A * | 10/1987 | Ryynanen | B01D 45/12 209/722 |
| 4,746,340 A * | 5/1988 | Durre | B01D 45/12 55/347 |
| 4,801,310 A * | 1/1989 | Bielefeldt | B01D 17/0217 209/60 |
| 5,372,707 A | 12/1994 | Buchanan et al. | |
| 5,643,537 A | 7/1997 | Raterman et al. | |
| 5,648,544 A | 7/1997 | Semeria et al. | |
| 5,681,450 A | 10/1997 | Chitnis et al. | |
| 5,690,709 A | 11/1997 | Barnes | |
| 5,779,746 A | 7/1998 | Buchanan et al. | |
| 5,914,433 A | 6/1999 | Marker | |
| 6,166,282 A | 12/2000 | Miller | |
| 6,902,593 B2 | 6/2005 | Miller et al. | |
| 7,648,544 B2 | 1/2010 | Dewitz et al. | |
| 7,985,282 B2 | 7/2011 | Castagnos, Jr. et al. | |
| 8,025,717 B2 | 9/2011 | Dries et al. | |
| 8,419,835 B2 | 4/2013 | Krishnamurthy et al. | |
| 8,945,283 B1 * | 2/2015 | Krishnamurthy | B04C 3/04 55/347 |
| 2012/0037000 A1 * | 2/2012 | Krishnamurthy | B01D 45/16 95/269 |
| 2013/0152522 A1 * | 6/2013 | Stippich | B01D 45/16 55/398 |
| 2013/0152525 A1 | 6/2013 | Brandner et al. | |

FOREIGN PATENT DOCUMENTS

| | | |
|---|---|---|
| IN | 200804759 | 8/2008 |
| IN | 255593 | 3/2013 |
| WO | WO 2007081832 | 7/2007 |

OTHER PUBLICATIONS

Hoffmann et al., "Effect of pressure recovery vanes on the performance of a swirl tube . . . ," Energy & Fuels (2006), 20(4), 1691-1697.

* cited by examiner

APPARATUSES AND METHODS FOR GAS-SOLID SEPARATIONS USING CYCLONES

BACKGROUND OF THE INVENTION

Embodiments of the invention relate to apparatuses and methods for gas-solid separation and particularly for the separation of gas effluents from fluidized particle beds, including those used for catalytic reactions and catalyst regenerations involving solid catalysts. Example embodiments relate more particularly to cyclone separators used in gas-solid separators.

Fluidized beds are currently used extensively in major industries including oil refining, petrochemical production, coal and mineral beneficiation, metallurgical applications, food processing, etc. Fluidized beds of solid particles, and particularly those operating in the bubbling regime, advantageously provide very uniform gas-solid contacting conditions due to thorough mixing. Fluidization generally causes not only local mixing but also large-scale circulation within the bed. These benefits of solid particle fluidization, however, are not without consequences. The most significant of these is the entrainment (elutriation or carryover) of solid particles due to the passage of gas bubbles through the dense phase of the fluidized solid particle bed and breakage of these bubbles at the surface of the dense phase. The bursting action of the bubbles throws large amounts of the particulate solids into the dilute phase directly above the dense phase. This in turn causes entrainment of particles having a sufficiently small diameter, namely such that their terminal velocity (which decreases with decreasing particle size) is below the superficial velocity of the rising gas.

Particular fluidized bed systems of practical interest in the refining and petrochemical fields include those used in catalytic conversions in the presence of a solid particulate catalyst. The use of fluidized beds of catalyst is favorable, for example, in conversion processes in which catalyst deactivation, due to the accumulation of carbonaceous deposits (coke) during the course of the conversion, occurs rapidly. In such cases, deactivated catalyst from a reaction zone must be passed to a regeneration zone for removal of the accumulated deposits by combustion, followed by return of the regeneration catalyst back to the reaction zone. Fluidized beds of catalyst in both the catalytic reactor and catalytic regenerator allow for continuous circulation of spent (coked) and regenerated catalyst between these apparatuses.

One example of a refining process utilizing fluidized bed reaction and regeneration zones is fluid catalytic cracking (FCC). FCC is applicable for the conversion of relatively high boiling or heavy hydrocarbon fractions, such as crude oil atmospheric and vacuum column residues and gas oils, to produce more valuable, lighter hydrocarbons and particularly those in the gasoline boiling range. The high boiling feedstock is contacted in one or more reaction zones with a particulate cracking catalyst that is maintained in a fluidized state under conditions suitable for carrying out the desired cracking reactions. In the fluidized contacting or reaction zone, carbonaceous and other fouling materials are deposited on the solid catalyst as coke, which reduces catalyst activity. The catalyst is therefore normally conveyed continuously to another section, namely a regeneration zone, where the coke is removed by combustion with an oxygen-containing regeneration gas. The resulting regenerated catalyst is, in turn, continuously withdrawn and reintroduced in whole or in part to the reaction zone.

More recently, fluidized bed systems have been applied in the production of light olefins, particularly ethylene and propylene, which are valuable precursors for polymer production. The light olefins are desirably obtained from non-petroleum feeds comprising oxygenates such as alcohols and, more particularly, methanol, ethanol, and higher alcohols or their derivatives. Methanol, in particular, is useful in a methanol-to-olefin (MTO) conversion process described, for example, in U.S. Pat. No. 5,914,433. This patent and others teach the use of a fluidized bed reactor with continuous circulation of spent catalyst from the reactor to a regenerator. The regenerator can similarly contain a fluidized bed of solid catalyst particles for carrying out regeneration by the combustion of deposited coke.

In processes such as FCC and MTO, the use of fluidized particle beds in the reaction and regeneration zones leads to entrainment of solids into the gaseous effluents from these zones. In the case of the reaction zone, catalyst particles can exit with the reactor effluent, containing the desired reaction products (e.g., gasoline boiling range hydrocarbons in the case of FCC or light olefins in the case of MTO). Likewise, catalyst particles may similarly become entrained in the combustion gases exiting the catalyst regenerator (e.g., containing nitrogen, $CO_2$, CO, and $H_2O$). Catalyst fines contained in the regenerator flue gas effluent are known to interfere with downstream power generation equipment such as the expander. In general, the losses of entrained catalyst from a fluidized bed, such as a catalytic reactor or catalyst regenerator, result in increased costs, particularly on an industrial scale. This is especially true considering the high cost of the zeolite-containing catalysts used currently in FCC and the non-zeolitic molecular sieve catalysts (e.g., silicoaluminophosphates or SAPOs) used currently in MTO.

To minimize losses of entrained catalyst particles, a number of gas-solid separators have been proposed for use in disengagement or separation zones, located above the dense bed phase, in reactors and regenerators having fluidized solid catalyst beds. These separators, including cyclones, filters, screens, impingement devices, plates, cones, and other equipment, have been used with varying success. Cyclone separators have gained widespread use in both FCC and MTO as described, for example, in U.S. Pat. No. 8,419,835 and in U.S. Pat. No. 6,166,282. Cyclone separators have been applied in both the catalytic reactors and catalyst regenerators of these conversion processes.

Refiners have also used a cyclone-containing third stage separator (TSS), external to the catalyst regenerator, to remove catalyst fines from the FCC regenerator flue gas (i.e., the combustion gas exiting the regenerator). These devices have typically been used in power recovery installations to protect expander blades. In the TSS, flue gas from the FCC catalyst regenerator is passed through a number of high efficiency cyclonic elements arranged in parallel and contained within the TSS vessel. The flue gas enters the vessel through a flow distributor that evenly distributes the gas to the individual cyclone elements. After catalyst particulates are separated from the flue gas in the cyclones, the clean flue gas leaves the separator. The solid particulates are concentrated in a small stream of gas, called the underflow gas, which exits the bottom of the TSS.

Cyclones and other separation devices exhibit equipment (e.g., metal) erosion due to the high velocity of gases used and the interaction between these gases, containing entrained solid particles, and the walls of these devices. Erosion leads to a reduction in equipment life and/or increased costs due to maintenance and downtime. For example, it has been observed that, over the course of continuous operation over a prolonged time period on the order of several years, considerable erosion may occur within the separator cyclone barrel. If sufficiently severe, such erosion may require localized repair or replacement of the entire cyclonic separator, which may necessitate shutdown of the TSS and possibly the FCC system as a whole.

Erosion issues mainly arise from a large central hub outside diameter within the cyclone. Typically, swirling flow in an annular section within the cyclone (between the central hub and the cyclone barrel) contracts from a diameter corresponding to the central hub outside diameter to the center of the cyclone barrel, with an associated increase in the velocity and a low pressure region at the center. As a result, the gas stream at the barrel's inner diameter (i.e., the barrel wall) momentarily contracts to a smaller diameter. This causes an abrupt change in the particle flow direction and erodes the barrel wall. In addition to the erosion problem, the large empty volume taken up by the central hub is inefficient and increases the size of the vessel housing the cyclones.

Other devices are designed to circumvent the erosion problem by simply reducing the central hub diameter. However, for a given helical pitch (turns/angle), the path traced by the helical curve is more vertical at the hub and more horizontal at the cyclone's barrel. For this reason, the flow at the center will have a more vertical trajectory than at the outside, which is undesirable from a separation perspective. This disadvantage can be circumvented by varying the height of the swirl vane along the radius, for instance by using a small height at the central hub and a larger height at the barrel. However, this creates a potential for structural vibration issues due to the large span.

There is therefore an ongoing need in the art for apparatuses and methods that promote the desired separation of solids (e.g., catalyst particles), from gases (e.g., reactor and regenerator effluents) into which these solid particles are entrained, while simultaneously minimizing the erosion and consequent particle attrition.

SUMMARY OF THE INVENTION

One aspect of the invention involves a cyclone for a gas-solid separator. The cyclone comprises a barrel having an interior, and a central hub disposed within the interior of the barrel. A plurality of concentric annular sections are disposed radially between the barrel and the central hub. Swirl vanes extend radially into at least one of the annular sections to define a swirl chamber within said at least one of the plurality of annular sections. At least one solid particle outlet is disposed at a lower end of the barrel. A gas outlet is in fluid communication with the interior of the barrel.

Another aspect of the invention provides a gas-solid separator. A gas-solid separator comprises an upper tube sheet, a lower tube sheet, and at least one cyclone extending through the tube sheets. The cyclone comprises an impure gas inlet at an upper end of a barrel above the upper tube sheet. The cyclone further comprises a barrel having an interior, a central hub disposed within the interior of the barrel, and a plurality of annular sections disposed radially between the barrel and the central hub. Each of the plurality of annular sections is concentric with the barrel and the central hub. Swirl vanes extend radially into at least one of the plurality of annular sections to define a swirl chamber within said at least one of the plurality of annular sections. At least one solid particle outlet is disposed at a lower end of the barrel between the upper tube sheet and the lower tube sheet. A gas outlet is disposed below the lower tube sheet and is in fluid communication with the interior of the barrel. Processes for purifying a gas stream contaminated with solid particles are also provided.

DETAILED DESCRIPTION OF THE INVENTION

Figure 1:
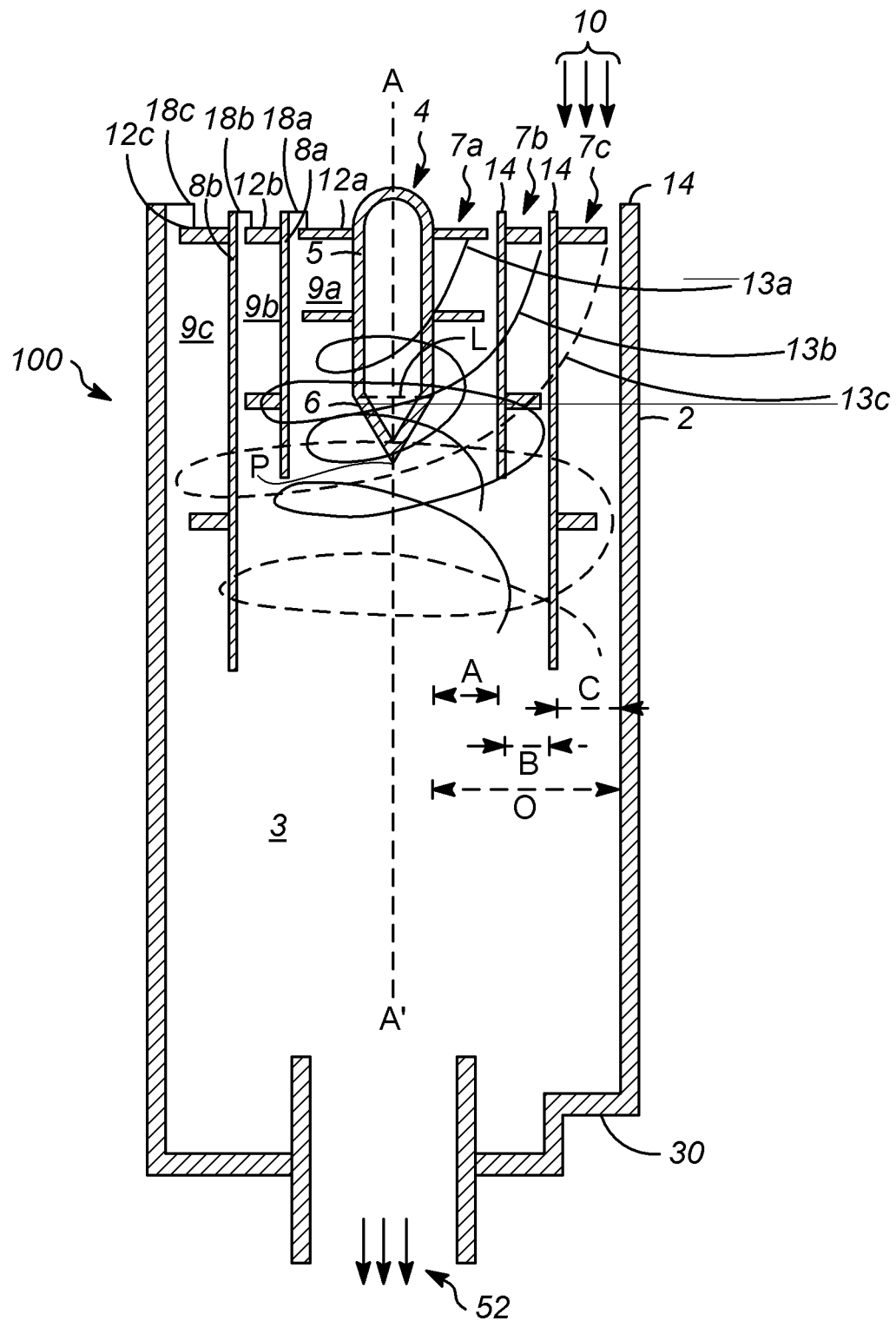
FIG. 1 is a side cut-out view taken along the axis of a representative cyclone according to an embodiment of the invention.

Embodiments of the invention involve apparatuses and methods for the separation of solid particles from gas streams contaminated with such particles. Example embodiments particularly relate to such apparatuses and methods in which particle attrition and/or metal erosion are reduced, and/or separation efficiency increased, compared to conventional gas-solid separation methods.

Particular applications of apparatuses and methods are in cyclone separations of catalytic reactor or catalyst regenerator effluent gases containing solid catalyst particles, and especially those applications known to be presently carried out using an external third stage separator (TSS) to clean the particle-containing effluent gas (i.e., combustion product gas) from a fluid catalytic cracking (FCC) catalyst regenerator, often after undergoing initial stages of cyclone separation within the regenerator. Due to these initial stages (e.g., first and second stages) of separation, solids in the effluent of the FCC catalyst regenerator, which can serve as a feed gas stream in example apparatuses and methods, are typically in the form of fine dust. For example, the average size of solid particles, namely catalyst fines, in this gas stream is generally in the range from about 1 micron ($\mu$m) to about 75 $\mu$m, and often in the range from about 5 $\mu$m to about 50 $\mu$m. The high gas velocities required to "de-dust" the FCC catalyst regenerator flue gas have given rise to concerns of equipment (metal) erosion, as discussed above.

Although particularly applicable for use in TSS apparatuses external to an FCC catalyst regenerator, the apparatuses and methods described herein are broadly applicable to gas-solid separators having one or a plurality of cyclones that may be used in any number of industrial applications, and especially in fluidized bed applications in which solid particles tend to become entrained in gases exiting the dense bed phase and are desirably removed. Examples include gas effluent streams from fluidized catalyst beds used in the catalyst reaction zone and/or catalyst regeneration zone of FCC or MTO processes. The cyclones may be used in a vessel external to a reactor or regenerator vessel that contains a disengagement or separation zone above a dense fluidized bed zone. Such external vessels, in contrast to the reactor or regenerator vessel, are normally configured for flow of the solid particle containing feed gas in the downward direction.

Example embodiments provide a cyclone for a gas-solid separator. The cyclone comprises a barrel, which may be hollow and generally cylindrical and extend axially within the separator. The barrel has an interior, and a central hub is disposed within the interior of the barrel, preferably concentrically with the barrel. A plurality of concentric annular sections are disposed radially between the barrel and the central hub. Swirl vanes extend radially into at least one of the annular sections to define a swirl chamber within the at least one of the plurality of annular sections. At least one solid particle outlet is disposed at a lower end of the barrel. A gas outlet is in fluid communication with the interior of the barrel.

In an example embodiment, the cyclone further comprises at least one cylindrical partition disposed radially between an outer diameter of the central hub and an inner diameter of the barrel. The plurality of annular sections comprises an inner annular section defined radially between an outer diameter of the central hub and one of the at least one cylindrical partition. At least one additional annular section, e.g., an outer annular section and in some embodiments also one or more intermediate annular sections, is defined radially between the one of the at least one cylindrical partition and the inner diameter of the barrel. In an example embodiment, an axial height of the one of the at least one cylindrical partition is greater than an axial height of the central hub.

In an example embodiment, the cyclone further comprises a plurality of cylindrical partitions disposed radially between an outer diameter of the central hub and an inner diameter of the barrel. The plurality of annular sections comprises an inner annular section defined radially between an outer diameter of the central hub and an inner cylindrical partition, at least one intermediate annular section defined radially between the inner cylindrical partition and an outer cylindrical partition, and an outer annular section defined radially between an outer cylindrical partition and the inner diameter of the barrel. Additional intermediate annular sections can be defined by, for instance, additional intermediate cylindrical partitions. In an example embodiment, an axial height of the outer cylindrical partition is greater than an axial height of the inner cylindrical partition, and the axial height of the inner cylindrical partition is greater than an axial height of the central hub. In an example embodiment, an axial height of the inner cylindrical portion is greater than an axial height of a cylindrical portion of the central hub, and an axial height of the outer cylindrical portion is greater than an axial height of the inner cylindrical portion. In an example embodiment, for each of the plurality of annular sections, the bottom of the annular section is disposed axially below a bottom of the swirl vanes disposed in the annular section.

In an example embodiment, each of the plurality of annular sections further comprises an axial upper portion disposed axially above the swirl vanes. The axial upper portions of the plurality of annular sections split an incoming gas stream into multiple streams axially above the swirl vanes.

Other example embodiments provide a gas-solid separator, such as a third stage separator (TSS), comprising an upper tube sheet, a lower tube sheet, and at least one cyclone extending through the upper and lower tube sheets. The cyclone has an impure gas inlet at an upper end of a barrel, extending above the upper tube sheet. The cyclone further comprises a barrel having an interior, a central hub disposed within the interior of the barrel, and a plurality of annular sections disposed radially between the barrel and the central hub. Each of the plurality of annular sections is concentric with the barrel and the central hub. Swirl vanes extend radially into at least one of the plurality of annular sections to define a swirl chamber within the at least one of the plurality of annular sections. At least one solid particle outlet is disposed at a lower end of the barrel between the upper tube sheet and the lower tube sheet. A gas outlet, e.g., a purified gas outlet, is disposed below the lower tube sheet and is in fluid communication with the interior of the barrel. Preferably, the gas-solid separator comprises a plurality of such cyclones (e.g., from about 5 to about 300 cyclones, depending on the particular application, though more or fewer cyclones can be provided).

Still other example embodiments provide a process for purifying a gas stream contaminated with solid particles. The process comprises feeding the gas stream to a process gas inlet of a gas-solid separator. The gas-solid separator further comprises a plurality of cyclones. Each cyclone comprises a barrel having an interior, an impure gas inlet at an upper end of the barrel, a central hub disposed within the interior of the barrel, a plurality of annular sections disposed radially between the barrel and the central hub, each of the plurality of annular sections being concentric with the barrel and the central hub, swirl vanes extending radially into at least one of the plurality of annular sections to define a swirl chamber within said at least one of the plurality of annular sections, at least one solid particle outlet disposed at a lower end of the barrel, and a gas outlet in fluid communication with the interior of the barrel. The process gas inlet is in communication with the impure gas inlets of the plurality of cyclones. The process further comprises withdrawing an underflow gas stream from a particle-rich gas outlet in communication with the solid particle outlets of the plurality of cyclones; and withdrawing a clean gas stream from a particle-lean gas outlet in communication with the gas outlets of the plurality of cyclones. A representative gas stream is an effluent from a catalytic reaction zone or a catalyst regeneration zone of an FCC process or an MTO process. In example embodiments, in each of the plurality of cyclones, the swirl vanes impart a helical or swirling motion to the gas stream, wherein a plurality of swirling streams are provided within each of the plurality of cyclones. Further, in example embodiments, in each of the plurality of cyclones, the plurality of swirling streams recombine within the barrel, axially below the annular sections. In an example embodiment, solid particles in the recombined plurality of swirling streams are forced toward a wall of the barrel.

Example embodiments provide, among other things, cyclones for gas-solid separators. Example cyclones are especially applicable for use in a downflowing (or so-called "uniflow") third stage separator (TSS) for the removal of dust particles, such as solid catalyst fines, from the flue gas streams exiting the catalyst regenerator in FCC processes. The cyclones, however, are also broadly applicable to the removal of solid particles from gas streams in any number of applications where such removal is desired, particularly with respect to gas effluent streams from fluidized catalyst processes such as catalytic reactions and catalyst regenerations. Example process streams include those encountered in FCC as well as MTO processes, as described above.

Turning now to the drawings, a cyclone 100 according to an example embodiment is depicted in FIG. 1. The cyclone 100 includes a hollow barrel 2 that is normally cylindrical in shape and extends axially, e.g., along axis A-A'. An inner diameter (wall) of the barrel 2 defines a preferably cylindrical interior 3. A central hub 4 is disposed within the interior 3 of the barrel 2, in example embodiments in a concentric manner, and the central hub extends axially such that axis A-A' of the central hub and the barrel are aligned to provide a symmetrical flow geometry. The central hub 4 may have either a solid (i.e., not hollow) configuration or a hollow configuration. Other example configurations for barrels and central hubs are shown and described in commonly assigned U.S. Pat. No. 8,419,835 and in commonly assigned U.S. Pat. Pub. No. 2013/0152525. In the cyclone 100, the central hub 4 can take up a smaller radial portion of the interior 3 of the barrel 2 than in some conventional cyclones, though this is not required.

In the example cyclone 100, the central hub 4 has both an upper, non-tapered section 5 and a lower, tapered section 6. The upper, non-tapered section 5 may be a cylindrical section, while the lower, tapered section 6 may be, for example, in the form of a conical end cap. A top of the central hub 4 may have a hemispherical configuration. The terms "upper" and "lower" are used herein to reference relative axial heights when the cyclone 100 is positioned for its normal downflow operation (i.e., with gas flowing from the "upper" part to the "lower" part of the cyclone). The terms are not meant to require that the cyclone 100 to be oriented in any particular position. In other example embodiments, the central hub 4 includes only a non-tapered (e.g., cylindrical) section, with the lower, tapered section 6 being omitted.

A plurality (i.e., two or more) of concentric annular sections are disposed radially between the outer diameter of the central hub 4 and the inner diameter of the barrel 2. In the cyclone 100, three concentric annular sections, including an inner annular section 7a, an intermediate annular section 7b, and an outer annular section 7c, are provided, though the number of annular sections can be two, three, four, five, or greater. For example, there may be several intermediate annular sections (if more than three annular sections are provided) or the intermediate annular section can be omitted (if two annular sections are provided). Preferably, the number of annular sections is between two and five annular sections.

The annular sections 7a, 7b, 7c are generally defined by the outer diameter of the central hub 4, the inner diameter of the barrel 2, and one or more concentric cylindrical partitions, for example, inner and outer cylindrical partitions 8a, 8b disposed between the outer diameter of the central hub and the inner diameter of the barrel. The inner and outer cylindrical partitions 8a, 8b are concentric with the central hub 4 and the barrel 2 and extend axially through portions of the interior 3 of the barrel. The cylindrical partitions 8a, 8b can be embodied in metal, e.g., steel, cylinders or ceramic cylinders. The radial thickness of the cylindrical partitions 8a, 8b (e.g., thickness of metal sheets forming the partitions) can vary. The cylindrical partitions 8a, 8b need not be perfectly smooth cylinders. For example, the cylindrical partitions 8a, 8b can include several wedge shaped segments forming a closed, generally cylindrical shape.

In the cyclone 100, the inner annular section 7a is defined radially between the outer diameter of the central hub 4 and the inner diameter of the inner cylindrical partition 8a, and the axial height (i.e., the total height from top to bottom) of the central hub 4 generally (e.g., omitting an upper cap portion as shown in FIG. 1) defines the axial height of the inner annular section. The intermediate annular section 7b is defined radially between the outer diameter of the inner cylindrical partition 8a and the inner diameter of the outer cylindrical partition 8b, and the axial height of the inner cylindrical partition generally defines the axial height of the intermediate annular section. The outer annular section 7c is defined radially between the outer diameter of the outer cylindrical partition 8b and the inner diameter (wall) of the barrel 2, and the axial height of the outer cylindrical partition 8b generally defines the axial height of the outer annular section. In this way, an overall annular section (having radial width O in FIG. 1) defined between the outer diameter of the central hub 4 and the inner diameter of the barrel 2 is divided into a plurality of annular sections 7a, 7b, 7c, each having radial widths A, B, C. The number of cylindrical partitions can define the number of annular sections in the cyclone (e.g., n partitions can define n+1 annular sections). Radial widths A, B, C of the annular sections 7a, 7b, 7c can be defined by the diameter(s) of the cylindrical partitions 8a, 8b, and these radial widths can be equal or unequal (in any proportion) to one another.

The annular sections 7a, 7b, 7c include a plurality of swirl chambers 9a, 9b, 9c for flow of an incoming gas stream 10 therethrough. Each of the swirl chambers 9a, 9b, 9c includes one or more (e.g., one to twelve) swirl vanes 12a, 12b, 12c, which are preferably helical and extend radially into a portion of the respective annular section 7a, 7b, 7c. Other example swirl vanes are shown and described in commonly assigned U.S. Pat. Pub. No. 2013/0152525, though still other configurations for the swirl vanes are possible. Example swirl vanes 12a, 12b, 12c are metal, e.g., aluminum or steel. The swirl vanes 12a, 12b, 12c may be fixedly coupled to (e.g., mounted to attached to), or formed as an integral (e.g., unitary) piece with, the central hub 4, the inner cylindrical partition 8a, the outer cylindrical partition 8b (or additional cylindrical partition for additional annular sections), or the barrel 2.

The incoming gas stream 10 is split and directed into the annular sections 7a, 7b, 7c due to the flow barriers provided by the central hub 4, the cylindrical partitions 8a, 8b, and the barrel 2. Preferably, the cyclone 100 splits the gas stream into multiple streams 13a, 13b, 13c in the respective annular sections 7a, 7b, 7c axially above the swirl vanes 12a, 12b, 12c. For example, axially upper portions 14 (e.g., walls) of the annular sections 7a, 7b, 7c, particularly axially upper portions of the cylindrical partitions 8a, 8b, and/or the barrel 2 can extend above a top of the swirl vanes 12a, 12b, 12c to an input of the cyclone 100 to split the incoming gas stream 10 into the three streams 13a, 13b, 13c axially above the swirl vanes. Once in the swirl chambers 9a, 9b, 9c, the multiple streams 13a, 13b, 13c preferably are separated from streams in other swirl chambers, until swirling flows (shown in FIG. 1) are generated in each of the streams. The streams 13a, 13b, 13c, now having swirling flows, recombine downstream in the cyclone 100 below the annular sections 7a, 7b, 7c. In example embodiments, a vane exit angle of each of the swirl vanes 12a, 12b, 12c, is substantially equal among the annular sections 7a, 7b, 7c. "Substantially equal" can refer to plus or minus 10%. This helps reduce turbulence in the recombined streams 13a, 13b, 13c.

In an example embodiment, the respective axial heights among the central hub 4 and the cylindrical partitions 8a, 8b progressively increase as the annular sections 7a, 7b, 7c progress from radially inward to radially outward, so that a bottom of the annular sections has a progressively lower axial position from radially inward to radially outward annular sections. For example, the axial height of the inner cylindrical partition 8a can be made greater than that of the central hub 4 (either the axial height of the entire central hub, or the axial height of the upper, cylindrical section 5), and the axial height of the outer cylindrical partition 8b can be made greater than the axial height of the inner cylindrical partition 8a. Additional, radially outer cylindrical partitions can similarly increase in axial height.

In a particular example embodiment, the bottom of the inner cylindrical partition 8a (or a single cylindrical partition, if only one is provided) is disposed such that it is located below a bottom (e.g., below point P in FIG. 1) of the central hub 4, or at least below the bottom of the upper cylindrical section 5 of the central hub (e.g., below line L in FIG. 1) by an axial distance of between 1-1000% of the width of the inner annular section 7a. If the central hub 4 does not include the lower tapered section 6 (e.g., terminates at line L), or otherwise does not decrease in diameter at a lower section, the bottom of the inner cylindrical partition 8a (or a single cylindrical partition, if only one is provided) is disposed such that it is located below a bottom of the central hub (e.g., below line L) by an axial distance of between 1-1000% of the width of the inner annular section 7a. Further, the bottom of the intermediate cylindrical partition 8b is disposed at least below the bottom of the inner cylindrical partition 8a by an axial distance of between 1-1000% of the width of the intermediate annular section 7b. The bottom of an additional cylindrical partition, if more than two are provided, would similarly be disposed axially lower than the previous cylindrical partition by an axial distance of between 1-1000% of the width of the next annular section, and so on.

In this way, the axial height of the intermediate annular section 7b is greater (and/or its bottom lower) than that of the inner annular section 7a, and similarly the axial height of the outer annular section 7c is greater (and/or its bottom lower) than that of the intermediate annular section 7b. In some example embodiments, the amount of change in axial height from one annular section to the next radially outer annular section in an example embodiment is up to two times the diameter of the central hub 4, and in a particular example embodiment is approximately equal to the diameter of the central hub 4. The increase in axial height can be, but need not be, equal between adjacent annular sections.

Increasing the axial height of the cylindrical partitions 8a, 8b in this way can provide or maintain a desirable height between a bottom of the swirl vanes 12a, 12b, 12c and the bottom of the annular sections 7a, 7b, 7c, where the streams 13a, 13b, 13c are joined with the streams from an adjacent annular section. Thus, for each of the plurality of annular sections 7a, 7b, 7c the bottom of the annular section is disposed axially below a bottom of the swirl vanes 12a, 12b, 12c disposed in the annular section. This allows a first swirling flow development for the inner stream 13a before it combines with the intermediate (swirling) stream 13b, and then combines with the outer (swirling) stream 13c. Swirling flow development is thus established separately in each swirl chamber 9a, 9b, 9c within the annular sections 7a, 7b, 7c before the swirling streams 13a, 13b, 13c are progressively combined with one another.

In an example manufacturing method for the cyclone 100, the barrel 2 is provided (e.g., fabricated) using methods known to those of ordinary skill in the art, to provide a first component. The outer cylindrical partition 8b is fabricated with the outer swirl vanes 12c fixedly attached thereto (e.g., welded to the outer diameter of the outer cylindrical partition) to provide a second component. The inner cylindrical partition 8a is fabricated with the intermediate swirl vanes 12b fixedly attached thereto (e.g., welded to the outer diameter of the inner cylindrical partition) to provide a third component. The central hub 4 is fabricated with the inner swirl vanes 12a fixedly attached thereto (e.g., welded to the outer diameter of the central hub) to provide a fourth component. The barrel 2, the inner cylindrical partition 8a, and the outer cylindrical partition 8b can each include a plurality of connecting members such as notches (not shown). Mating connecting members such as lugs (not shown) are mounted (e.g., welded) to the central hub 4, the inner cylindrical partition 8a, and the outer cylindrical partition 8b for mating with the notches of the next outer piece.

To assemble the cyclone 100, the outer cylindrical partition 8b with the outer swirl vanes 12c is placed within the barrel 2, and the lugs on the outer cylindrical partition are connected with or sit within the notches in the barrel. The inner cylindrical partition 8a with the intermediate swirl vanes 12b is then placed within the outer cylindrical partition 8b, and the lugs on the inner cylindrical partition are connected with or sit within the notches in the outer cylindrical partition. The central hub 4 with the inner swirl vanes 12a is then placed within the inner cylindrical partition, and the lugs on the central hub are connected with or sit within the notches on the inner cylindrical partition. The assembly order can be reversed.

In other example manufacturing methods, welded rods (not shown) are provided between the central hub 4 and the inner cylindrical partition 8a, between the inner cylindrical partition 8a and the outer cylindrical partition 8b, and between the outer cylindrical partition 8b and the barrel 2. These rods can align with the top of the swirl vanes 12a, 12b, 12c such that a shadow of the rods falls on a thickness of the respective swirl vanes. Inner fabricated components can be placed into and supported by the next outer component. In still other example manufacturing methods, the fabricated swirl vanes 12a, 12b, 12c, include connecting members such as hooks 18a, 18b, 18c (FIG. 1, only one of each is shown) attached thereto, e.g., welded to a top of the swirl vanes, and the hooks engage (e.g., sit on) the wall of the inner cylindrical partition 8a (hooks 18a), the outer cylindrical partition 8b (hooks 18b), and the barrel 2 (hooks 18c), respectively, during assembly of the cyclone. It will be appreciated that these or other methods can be altered or expanded to provide other numbers of annular sections. In yet other example manufacturing methods, the central hub 4, the barrel 2, the cylindrical partitions 8a, 8b, and the swirl vanes 12a, 12b, 12c are cast as a single piece.

Including a plurality of concentric annular sections, such as annular sections 7a, 7b, 7c in the cyclone 100, can provide various benefits. For example, in conventional cyclones, where the diameter of the central hub begins to decrease, the swirling flow of the incoming gas stream in the annular section contracts, or squeezes, to the center of the cyclone, with an associated increase in velocity and a low pressure region at the center. This in turn causes the gas at the inner diameter of the barrel to momentarily contract to a smaller diameter, causing an abrupt change, or acceleration, in the particle flow direction. This acceleration erodes the inner diameter of the barrel.

In the cyclone 100, the incoming gas stream 10 is split into multiple concentric streams 13a, 13b, 13c, each of which separately develop a swirling flow within the swirl chambers 9a, 9b, 9c. The inner, swirling, stream 13a preferably exits the swirl chamber 9a before the next outer, swirling stream 13b exits the swirl chamber 9b, which preferably occurs before the next outer, swirling stream 13c exits the swirl chamber 9c, and so on. The multiple streams 13a, 13b, 13c help to shield the inner diameter (wall) of the barrel 2 from the acceleration of the particle flow when the diameter of the central hub 4 begins to decrease. Further, the cyclone 100 replaces typically larger central hubs in conventional cyclones with multiple, parallel, concentric flow paths (e.g., inner streams 13a, 13b) and allows a preferably smaller central hub 4. This increases the volumetric capacity of the cyclone 100 for a given barrel diameter and increases separation efficiency of the cyclone 100 for a given gas stream 10, by eliminating the generating eddies that would otherwise result by merely shrinking the central hub. The increased volumetric capacity translates to a reduction in the number of cyclones relative to the large hub designs and thus can reduce the size of a gas-solid separator such as a TSS.

A solid particle outlet 30 disposed at a lower end of the barrel 2 is designed for removal of concentrated solids, in an underflow gas, which are forced to this radial periphery by centrifugal forces established in the recombined (swirling) streams 13a, 13b, 13c which provide a downwardly-flowing, swirling gas. The solid particle outlet 30 may be embodied in one or more openings or throughways (e.g., slots or holes) in the side of the barrel 2 or anywhere at or its lower end. "Lower end" as used herein refers to anywhere axially at the bottom half of the barrel 2. Preferably, the solid particle outlet 30 is disposed at an axial height equal to a multiple (e.g., 0.1 to 10) of the diameter of the barrel 2 from the bottom of the outer most partition (e.g., the bottom of outer cylindrical partition 8b in FIG. 1). A gas outlet, preferably a purified gas outlet 52, concentric with the barrel 2, is disposed at an axially bottom opening of the barrel and is in fluid communication with the interior 3 of the barrel. The gas outlet 52 can be embodied in any suitable opening for exit of the gas stream 10. An example gas outlet 52 is embodied in a tube or other fluid conduit extending partially into an opening of the barrel 2, or can merely be an opening in the barrel itself. Preferably, a top opening of the gas outlet 52 is disposed at an axial height equal to a multiple (e.g., 0.1 to 10) of the diameter of the barrel 2 from the bottom of the outer most partition (e.g., the bottom of outer cylindrical partition 8b in FIG. 1). The gas outlet 52 is configured for removal of a clean gas having a greatly reduced solids concentration, relative to the underflow gas.

Figure 2:
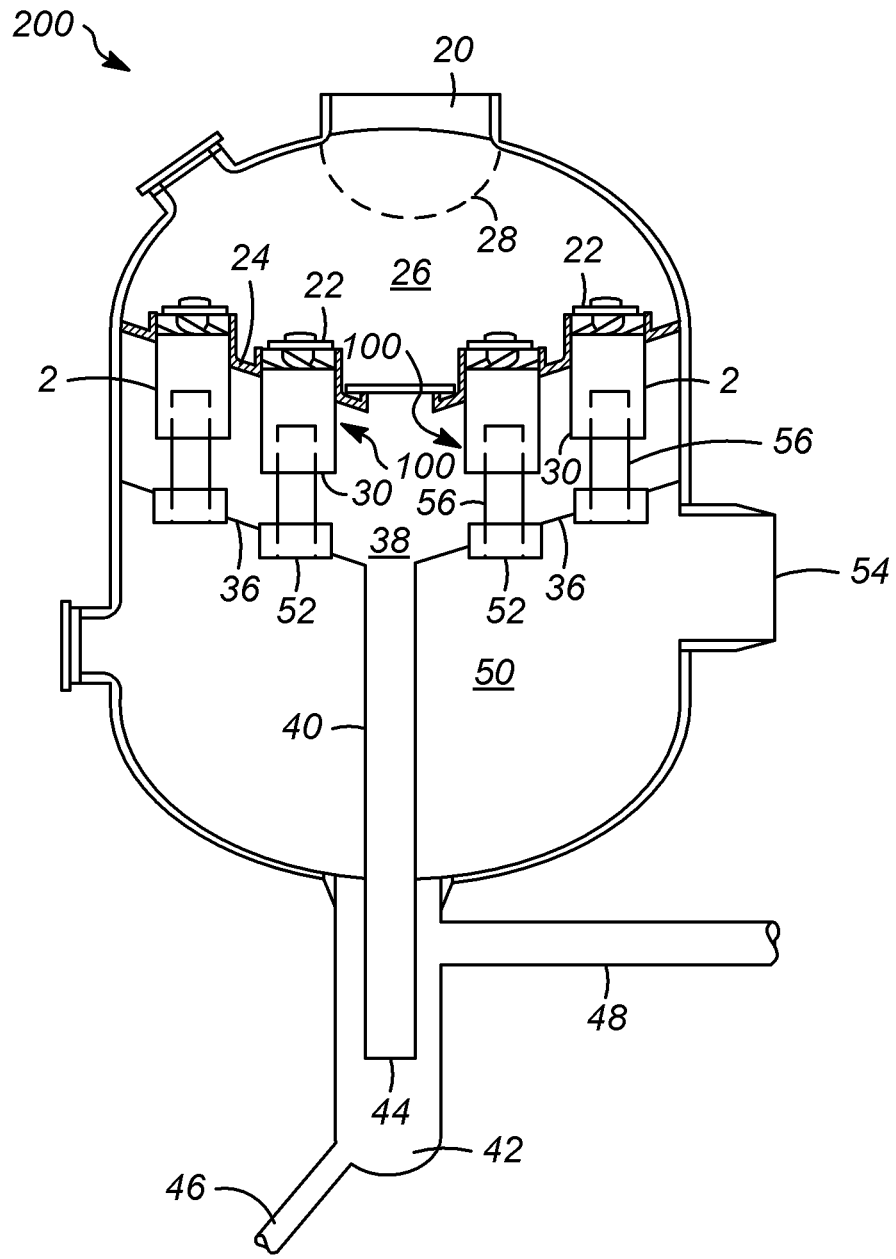
FIG. 2 is a side cut-out view taken along the axis of a solid-gas separator having a plurality of cyclones as shown in FIG. 1.

FIG. 2 depicts a gas-solid separator 200 such as a TSS, having a plurality of cyclones 100 as described herein. While only four cyclones 100 are represented in FIG. 2, between about 5 and 300 cyclones, and in some example embodiments between about 10 and about 200 cyclones, may be used depending on the particular gas-solid separation operation.

In operation, a gas stream is fed to the gas-solids separator 200 through a process gas inlet 20, which communicates with impure gas inlets 22 at upper ends of the barrels 2 of the plurality of cyclones 100, providing the gas stream 10 (FIG. 1) for each of the cyclones. The impure gas inlets 22 extend above an upper tube sheet 24. The upper tube sheet 24 at least partially defines an inlet chamber 26 that limits communication between this chamber and the rest of the gas-solid separator 200. The gas stream entering the gas-solid separator 200 may be distributed via a diffuser 28 to process gas inlets 22 of the plurality of cyclones 100 containing swirl vanes (eight in FIG. 1), providing the gas stream 10 to each of the cyclones.

As shown in FIG. 1, the gas stream 10 is split into the three streams 13a, 13b, 13c. For each of these streams 13a, 13b 13c, the swirl vanes 12a, 12b, 12c within the swirl chambers 9a, 9b, 9c restrict the gas stream flow path, thereby accelerating the flowing gas streams. The swirl vanes 12a, 12b, 12c also impart a helical or spiral motion to the flowing gas streams 13a, 13b, 13c, providing a plurality of swirling streams in the cyclone 100. The swirling gas streams 13a, 13b, 13c exit the swirl chambers 9a, 9b, 9c, preferably with the inner swirling gas stream 13a exiting axially above the intermediate swirling gas stream 13b, and so on. The exiting swirling gas streams 13a, 13b, 13c recombine within the interior 3 of the barrel 2, axially below the annular sections 7a, 7b, 7c as described above, and the swirling flows in the recombined swirling gas streams force the higher-density solids toward the wall of the barrels 2. Solid particles directed to the swirl periphery in this manner fall through the solid particle outlets 30 of the cyclones 100. Solid particle outlets 30, at lower ends of the barrels 2, extend to positions located between the upper tube sheet 24 and a lower tube sheet 36. A solids chamber 38 is therefore defined between these tube sheets 24, 36.

An underflow gas stream is withdrawn from a particle-rich gas outlet 44 in communication with the solid particle outlets 30 of the plurality of cyclones 100. The particle-rich gas outlet 44 is at a lower end of the solids outlet tube 40, extending from the solids chamber 38 into a collection vessel 42. The solids outlet tube therefore transports solids collected on the lower tube sheet 36 into this collection vessel 42. A high percentage of the solid particles contained in the total gas fed to the gas-solid separator 200, generally at least about 95% by weight, typically at least about 98% by weight, and often at least about 99% by weight, is transferred out of the collection vessel 42 via the solids outlet tube 40.

Underflow gas is therefore the portion, typically from about 1% to about 10% by volume, and often from about 3% to about 5% by volume, of the total gas fed to the gas-solid separator 200 that is directed to the solids outlet tube 40 and carries away the removed solid particles. The underflow may carry these solid particles into the collection vessel 42, where the level can be controlled by a slide valve (not shown) on a conduit 46. When a level of solids is established in the collection vessel 42, the underflow vapor can turn back up into the transfer pipe 48.

As shown in FIG. 2, the bottom of the gas-solid separator 200 may be defined by a hemispherical region that is a clean gas chamber 50. A clean gas flows down along the central axes (A-A' in FIG. 1) of the cyclones 100 and through (purified) gas outlets 52 extending below the lower tube sheet 36. A clean gas stream is therefore withdrawn from a particle-lean gas outlet 54 in communication with the purified gas outlets 52 of the plurality of cyclones 100. As shown in the example embodiment illustrated in FIG. 2, clean gas first passes through the gas outlets 52, e.g., open-ended cyclone gas outlet tubes, to below the lower tube sheet 36 and then into the clean gas chamber 50. The lower tube sheet 36 limits communication between the clean gas chamber 50 and the solids chamber 38. The clean gas stream that is withdrawn through the particle-lean gas outlet 54 represents the bulk of the gas stream fed to the gas-solid separator 200. The solids concentration of the clean gas is typically less than about 100 mg/Nm$^3$ and often less than about 50 mg/Nm$^3$. A representative gas-solid separator is generally capable of removing essentially all solid (e.g., catalyst) particles having a diameter of 20 microns or greater.

Example apparatuses and methods are provided for removing solid particles from gas streams, including refining and petrochemical process streams such as gas effluents from fluidized bed processes. Representative process streams include effluents from catalytic reaction zones and/or catalyst regeneration zones of FCC or MTO processes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the invention as set forth in the appended claims.

What is claimed is:

1. A cyclone for a gas-solid separator, the cyclone comprising:
   a barrel having an interior;
   a central hub disposed within the interior of the barrel;
   a plurality of concentric annular sections disposed radially between the barrel and the central hub, each of the plurality of annular sections being concentric with the barrel and the central hub;
   swirl vanes extending radially into at least one of the plurality of annular sections to define a swirl chamber within said at least one of the plurality of annular sections;
   at least one solid particle outlet disposed at a lower end of the barrel;

a gas outlet in fluid communication with the interior of the barrel; and at least one cylindrical partition disposed radially between an outer diameter of the central hub and an inner diameter of the barrel.

2. The cyclone of claim 1, wherein the plurality of annular sections comprises an inner annular section defined radially between an outer diameter of the central hub and one of the at least one cylindrical partition, and at least one additional annular section defined radially between the one of the at least one cylindrical partition and the inner diameter of the barrel.

3. The cyclone of claim 2, wherein an axial height of the one of the at least one cylindrical partition is greater than an axial height of the central hub.

4. The cyclone of claim 1, further comprising a plurality of cylindrical partitions disposed radially between an outer diameter of the central hub and an inner diameter of the barrel;

wherein the plurality of annular sections comprises an inner annular section defined radially between an outer diameter of the central hub and an inner cylindrical partition, at least one intermediate annular section defined radially between the inner cylindrical partition and an outer cylindrical partition, and an outer annular section defined radially between the outer cylindrical partition and the inner diameter of the barrel.

5. The cyclone of claim 4, wherein an axial height of the inner cylindrical partition is greater than an axial height of the central hub; and wherein an axial height of the outer cylindrical partition is greater than the axial height of the inner cylindrical partition.

6. The cyclone of claim 4, wherein an axial height of the inner cylindrical partition is greater than an axial height of a cylindrical section of the central hub; and wherein the axial height of the outer cylindrical partition is greater than the axial height of the inner cylindrical partition.

7. The cyclone of claim 4, wherein for each of the plurality of annular sections, the bottom of the annular section is disposed axially below a bottom of the swirl vanes disposed in the annular section.

8. The cyclone of claim 1 wherein, in each of the annular sections, axial upper portions of the annular sections split an incoming gas stream into multiple streams axially above the swirl vanes.

9. A gas-solid separator comprising an upper tube sheet, a lower tube sheet, and at least one cyclone extending through the tube sheets, the cyclone comprising an impure gas inlet at an upper end of a barrel above the upper tube sheet, wherein the cyclone further comprises:

a barrel having an interior;
a central hub disposed within the interior of the barrel;
a plurality of annular sections disposed radially between the barrel and the central hub, each of the plurality of annular sections being concentric with the barrel and the central hub;
swirl vanes extending radially into at least one of the plurality of annular sections to define a swirl chamber within said at least one of the plurality of annular sections;
at least one solid particle outlet disposed at a lower end of the barrel between the upper tube sheet and the lower tube sheet;

a gas outlet below the lower tube sheet and in fluid communication with the interior of the barrel; and at least one cylindrical partition disposed radially between an outer diameter of the central hub and an inner diameter of the barrel.

10. The gas-solid separator of claim 9, comprising a plurality of cyclones, each comprising an impure gas inlet at an upper end of a barrel above the upper tube sheet, each cyclone further comprising:

a barrel having an interior;
a central hub disposed within the interior of the barrel;
a plurality of annular sections disposed radially between the barrel and the central hub, each of the plurality of annular sections being concentric with the barrel and the central hub;
swirl vanes extending radially into at least one of the plurality of annular sections to define a swirl chamber within said at least one of the plurality of annular sections;
at least one solid particle outlet disposed at a lower end of the barrel between the upper tube sheet and the lower tube sheet; and
a gas outlet below the lower tube sheet and in fluid communication with the interior of the barrel.

11. The gas-solid separator of claim 10, wherein the plurality of cyclones number from about 5 to about 300 cyclones.

12. The gas-solid separator of claim 11, further comprising a process gas inlet in communication with the impure gas inlets of the plurality of cyclones.

13. The gas-solid separator of claim 12, further comprising a particle-rich gas outlet in communication with the solid particle outlets of the plurality of cyclones.

14. The gas-solid separator of claim 13, further comprising a particle-lean gas outlet in communication with the gas outlets of the plurality of cyclones.

15. A process for purifying a gas stream contaminated with solid particles, the process comprising:

feeding the gas stream to a process gas inlet of a gas-solid separator, wherein the gas-solid separator further comprises a plurality of cyclones, each cyclone comprising a barrel having an interior, an impure gas inlet at an upper end of the barrel, a central hub disposed within the interior of the barrel, a plurality of annular sections disposed radially between the barrel and the central hub, each of the plurality of annular sections being concentric with the barrel and the central hub, swirl vanes extending radially into at least one of the plurality of annular sections to define a swirl chamber within said at least one of the plurality of annular sections, at least one solid particle outlet disposed at a lower end of the barrel, a gas outlet in fluid communication with the interior of the barrel, wherein the process gas inlet is in communication with the impure gas inlets of the plurality of cyclones; and at least one cylindrical partition disposed radially between an outer diameter of the central hub and an inner diameter of the barrel;

withdrawing an underflow gas stream from a particle-rich gas outlet in communication with the solid particle outlets of the plurality of cyclones; and withdrawing a clean gas stream from a particle-lean gas outlet in communication with the gas outlets of the plurality of cyclones.

16. The process of claim 15, wherein, in each of the plurality of cyclones, the swirl vanes in each of the annular sections impart a helical or spiral motion to the gas stream;

wherein a plurality of swirling streams are provided within each of the plurality of cyclones.

17. The process of claim 16, wherein, in each of the plurality of cyclones, the plurality of swirling streams recombine within the barrel, axially below the annular sections.

18. The process of claim 17, wherein solid particles in the recombined plurality of swirling streams are forced toward a wall of the barrel.

19. The process of claim 15, wherein the gas stream is an effluent from a catalytic reactor or a catalyst regenerator of a fluid catalytic cracking (FCC) process.

20. The process of claim 15, wherein the gas stream is an effluent from a catalytic reactor or a catalyst regenerator of a methanol to olefins (MTO) process.

* * * * *